(12) United States Patent
Estier

(10) Patent No.: US 10,071,609 B2
(45) Date of Patent: Sep. 11, 2018

(54) VEHICLE HAVING A HIGH CLEARING CAPABILITY

(71) Applicant: ECOLE POLYTECHNIQUE FEDERALE DE LAUSANNE (EPFL), Lausanne (CH)

(72) Inventor: Thomas Estier, Düdingen (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 15/124,358

(22) PCT Filed: Mar. 11, 2015

(86) PCT No.: PCT/EP2015/055067
§ 371 (c)(1),
(2) Date: Sep. 8, 2016

(87) PCT Pub. No.: WO2015/135986
PCT Pub. Date: Sep. 17, 2015

(65) Prior Publication Data
US 2017/0015168 A1    Jan. 19, 2017

(30) Foreign Application Priority Data
Mar. 11, 2014 (EP) .................................. 14158788

(51) Int. Cl.
*B60G 5/02* (2006.01)
*B60G 5/06* (2006.01)
(Continued)

(52) U.S. Cl.
CPC ................. *B60G 5/02* (2013.01); *B60G 5/06* (2013.01); *B60G 21/045* (2013.01);
(Continued)

(58) Field of Classification Search
CPC .......... B60G 5/02; B60G 5/06; B60G 21/045; B60G 2200/422; B60G 2200/44;
(Continued)

(56) References Cited

U.S. PATENT DOCUMENTS 4,977,971 A * 12/1990 Crane, III .................. B25J 5/00
180/8.3
6,589,098 B2 * 7/2003 Lee ....................... A63H 17/004
446/431

(Continued)

FOREIGN PATENT DOCUMENTS

FR          1337204 A     9/1963
FR          2161017 A1    7/1973
WO       WO0153145 A1    7/2001

OTHER PUBLICATIONS

International Search Report of PCT/EP2015/055067 dated Jul. 9, 2015 and English translation thereof.
(Continued)

*Primary Examiner* — Jacob D Knutson
*Assistant Examiner* — Marlon A Arce
(74) *Attorney, Agent, or Firm* — Andre Roland S.A.; Nikolaus Schibli

(57) ABSTRACT

The invention relates to a vehicle which includes at least four wheels and a base. Said wheels are attached in pairs at the base via connections and form a bogie consisting of a pair of wheels. Said bogies are rotatably hinged onto the base such that the pivot point of the path of the wheels is not physically present and said pivot point is located under the rotational axis of the wheels when the bogie is horizontal. The rotation of a bogie is transmitted by a transmission means to the other bogie such that the slant of each bogie in relation to the base forms an angle of identical but opposite value.

13 Claims, 24 Drawing Sheets

(51) Int. Cl.
  *B62D 7/15* (2006.01)
  *B60G 21/045* (2006.01)
  *B62D 61/04* (2006.01)
  *G05D 1/00* (2006.01)
  *G05D 1/02* (2006.01)

(52) U.S. Cl.
  CPC .......... *B62D 7/1509* (2013.01); *B62D 61/04* (2013.01); *B60G 2200/422* (2013.01); *B60G 2200/44* (2013.01); *B60G 2202/22* (2013.01); *B60G 2202/23* (2013.01); *B60G 2204/419* (2013.01); *B60G 2204/8302* (2013.01); *B60G 2300/07* (2013.01); *G05D 1/0011* (2013.01); *G05D 1/021* (2013.01)

(58) Field of Classification Search
  CPC ............ B60G 2202/22; B60G 2202/23; B60G 2204/419; B60G 2204/8302; B60G 2300/07; B62D 7/1509; B62D 61/04; G05D 1/0011; G05D 1/021
  See application file for complete search history.

(56) References Cited

U.S. PATENT DOCUMENTS

| | | | |
|---|---|---|---|
| 7,726,423 B2 | 6/2010 | Atley | |
| 8,540,040 B2* | 9/2013 | Simula | B62D 55/065 180/9.46 |
| 8,875,815 B2* | 11/2014 | Terrien | B25J 5/005 180/65.1 |
| 2007/0029871 A1* | 2/2007 | Wake | B62D 55/1083 301/124.1 |

OTHER PUBLICATIONS

Written Opinion of the International Search Authority dated Jul. 9, 2015.

Chinese 1st Office Action & Translation dated May 3, 2017 for counterpart 201580013512.4.

* cited by examiner

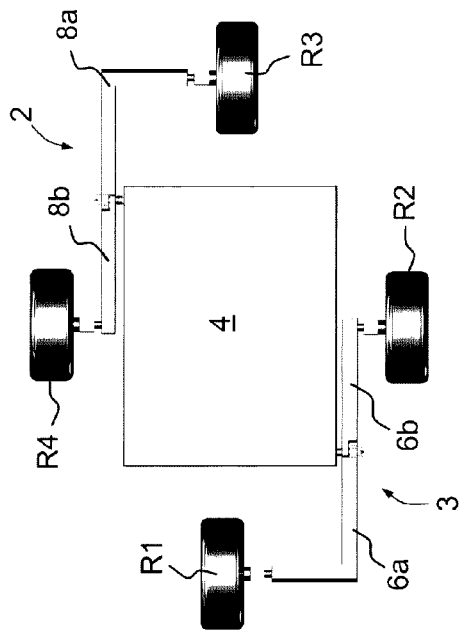
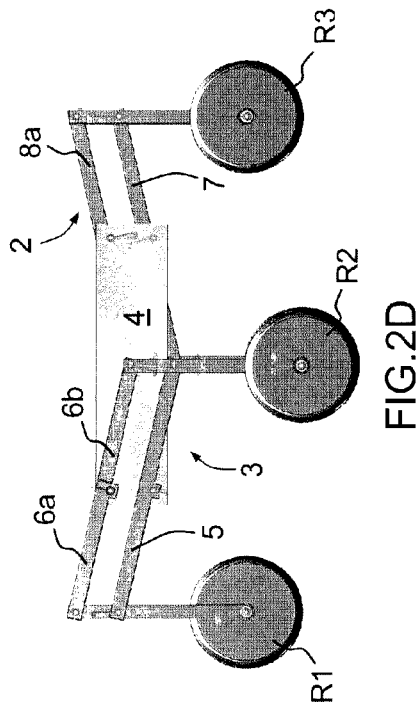
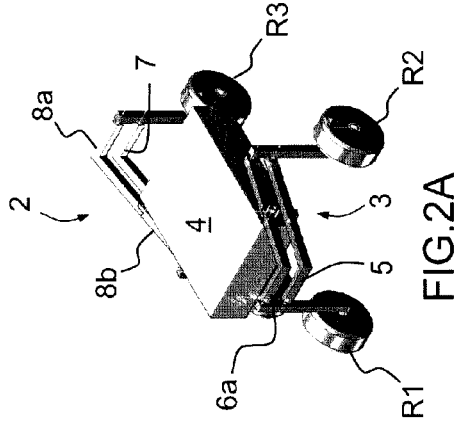
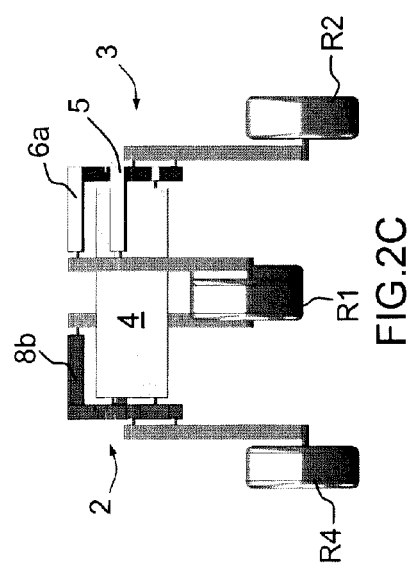
FIG.2A
FIG.2B
FIG.2C
FIG.2D

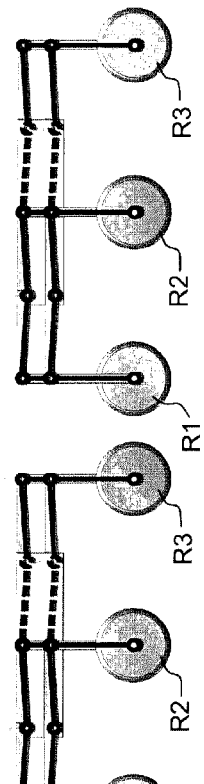
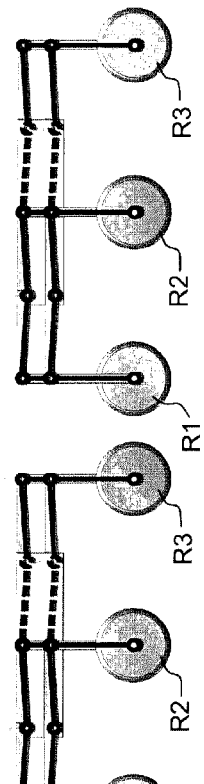
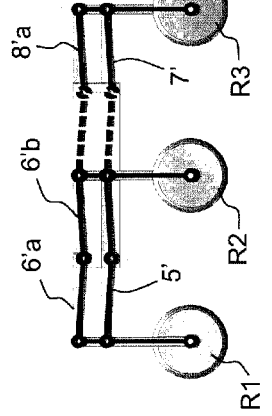
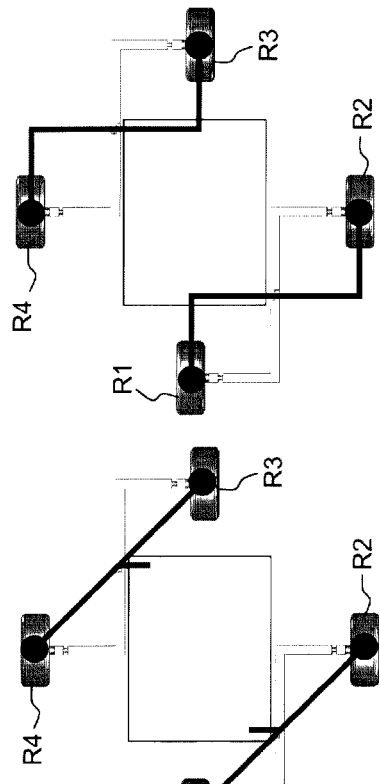
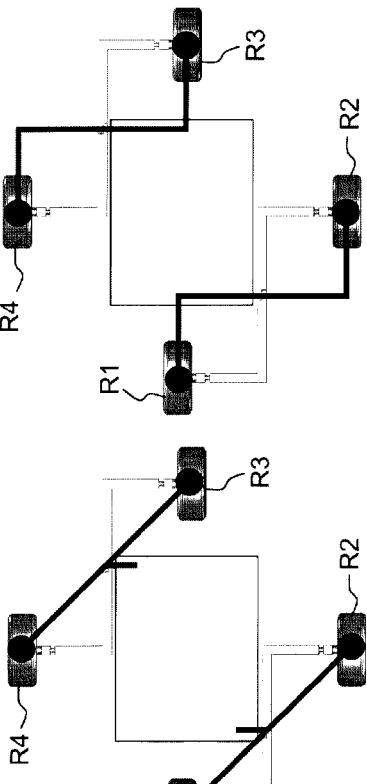
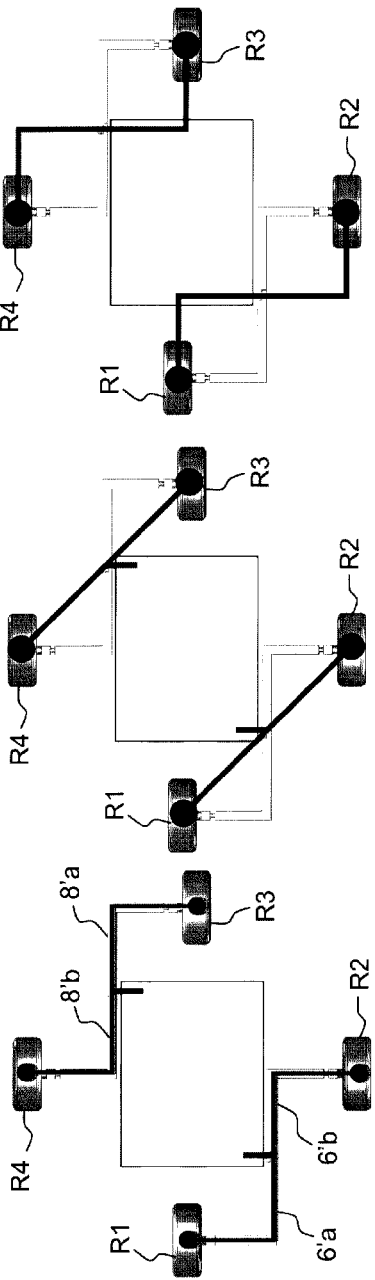
FIG.5E  FIG.5C  FIG.5A
FIG.5F  FIG.5D  FIG.5B ized and used, for example, in the

VEHICLE HAVING A HIGH CLEARING CAPABILITY

CROSS REFERENCE TO RELATED APPLICATIONS

The present application is a U.S. national stage application of PCT/EP2015/055067 filed on Mar. 11, 2015 that designates the U.S., and claims foreign priority to European patent application No. EP14158788.1 which was filed on Mar. 11, 2014, the entire contents of these two applications being incorporated by reference in the present application in their entirety.

TECHNICAL FIELD

The subject-matter of the present invention belongs to the field of vehicles for undulating terrain which are intended to be used in particular in specific environments in which mobility is considered to be difficult to accomplish, like natural or industrial disaster zones, or even on other planets. Such a vehicle is also intended to be used in buildings, nuclear power stations and other similar environments.

Such vehicles may be remote controlled or autonomous or driven by a user, in accordance with their size and the technical means on-board. Such a vehicle may also be proposed in the form of a toy.

PRIOR ART

Similar vehicles, such as robots, are known in the prior art.

For example, the application PCT WO 01/53145 discloses a vehicle for undulating terrain. That vehicle comprises six wheels and a chassis.

More specifically, the known vehicle comprises a chassis which is substantially constituted by a platform in the form of a lozenge and a rear support. The locomotion device is of the rolling type. It comprises a front rolling train with a wheel, a central train with two wheels in tandem at the right-hand side and two wheels in tandem at the left-hand side, and a rear train with a wheel which is connected to the support. Each wheel is provided with a motor. At least for the front and rear wheels, the connection between the wheel and the chassis comprises a rotary guiding unit which allows the wheel to rotate about an axis which is perpendicular to its own drive axis. A steering motor controls this rotation. The differential control of the rolling motors of the central train and that of the steering motors of the front and rear trains allows the vehicle to be steered and in particular allows it to be turned on the spot with minimal friction. The control units of the motors are concentrated in a central control member.

SUMMARY

An object of the invention is to improve the known systems and to provide a simpler and more effective vehicle than those currently known.

According to an embodiment, the invention relates to a vehicle having a great clearance capacity, comprising at least four wheels and a base. The wheels are fixed in pairs to the base by rigid means and form a bogie per pair of wheels, the bogies being articulated in terms of rotation to the base so that the pivot location of the trajectory of the wheels does not physically exist and that pivot location is located under the rotation axis of wheels when the bogie is horizontal; the rotation of one bogie being transmitted by a transmission means to the other bogie in such a manner that the inclination of each of the bogies in relation to the base forms an angle having a value which is identical but opposite.

For example, the rigid means which fix the wheels to the base may be bars.

According to an embodiment of the vehicle, the transmission means comprises a differential.

According to an embodiment, the transmission means comprises a damping means which may or may not be variable. That means may be a shock absorber.

According to an embodiment, the transmission means comprises a preload means. The preload means may be adjustable.

According to an embodiment, each wheel is driven individually.

According to an embodiment, at least one of the wheels can rotate about an axis which is perpendicular to the rotation axis thereof.

According to an embodiment, the trajectories of the wheels of a bogie are aligned in the same plane.

According to an embodiment, the trajectories of the wheels of a bogie are in two different and parallel planes.

According to an embodiment, the trajectory of a wheel of a bogie is in the same plane as that of a wheel of the other bogie.

According to an embodiment, the two bogies are aligned relative to each other or are offset relative to each other.

According to an embodiment, at least one of the wheels of a bogie is replaced by a pair of wheels.

According to an embodiment, the vehicle is remote controlled or driven or autonomous.

The architecture of the vehicle proposed comprises in particular a rigid and articulated chassis which connects the body of the vehicle to at least four drive wheels in such a manner that those wheels are permanently in contact with the ground and the weight of the vehicle is distributed between those four wheels.

As a result of the articulated chassis thereof providing a high ground clearance for it, the vehicle according to the invention is capable of overcoming obstacles whose size is significantly greater than the size of the wheels without any motorization other than that of the wheels. The chassis per se is therefore referred to as being passive, in contrast to an active chassis which would involve additional actuators in order to modify the configuration of the chassis, and is moved only by gravitational force alone.

An original feature involves the specific architecture of the chassis allowing for the first time the application of parallel bogies to a four-wheel vehicle; as opposed to a minimum of six wheels as in the prior art, see the publication WO 01/53145 cited above.

There are a number of fields of application which cover the whole of the applications of all-terrain vehicles. In particular, and in a non-exhaustive manner,
- interventions in the event of disasters (maneuvering in the debris),
- use of remote controlled or autonomous vehicles for operations in hostile environments for human beings (for example, ABC contamination, dismantling a nuclear power station) or for explosive device clearance (EDO & UXO),
- transporting loads, for example, in the field of construction and exploitation of mines,
- all-terrain utility or recreational vehicles,
- agriculture (in particular forestry or viticulture),
- the field of wheelchairs with a high degree of mobility,
- toys.

BRIEF DESCRIPTION OF THE SEVERAL VIEWS OF THE DRAWINGS

The invention will be better understood with reference to the figures which illustrate the principle of the invention and several configurations thereof.

FIGS. 2A to 2D illustrate a specific position of the invention;

FIGS. 5A to 5F illustrate three possible constructions of the same configuration of FIGS. 4A/4B;

DETAILED DESCRIPTION OF THE SEVERAL EMBODIMENTS

Figure 1A:
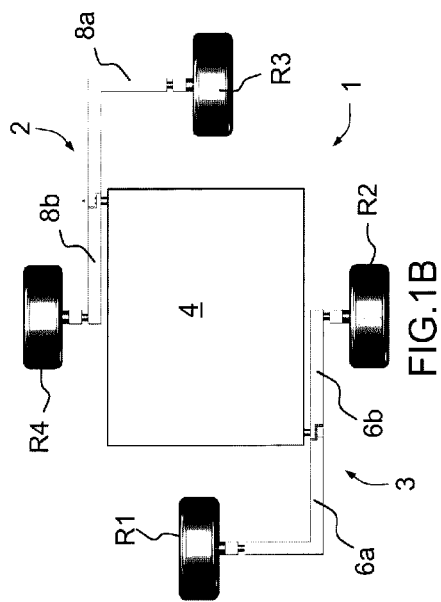
FIGS. 1A to 1D illustrate the principle of the invention.
Figure 1B:
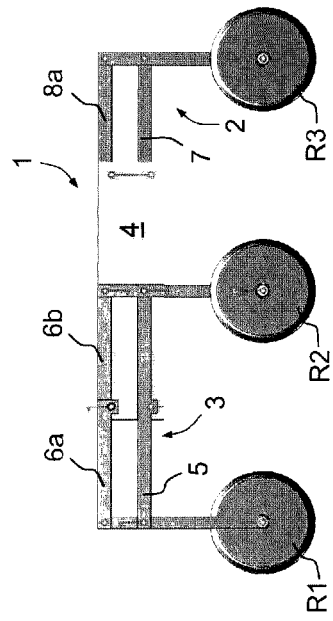
Figure 1C:
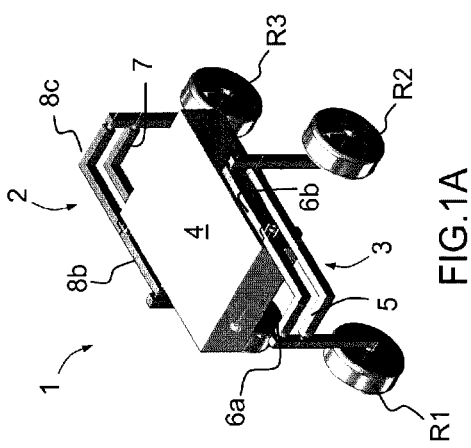
Figure 1D:
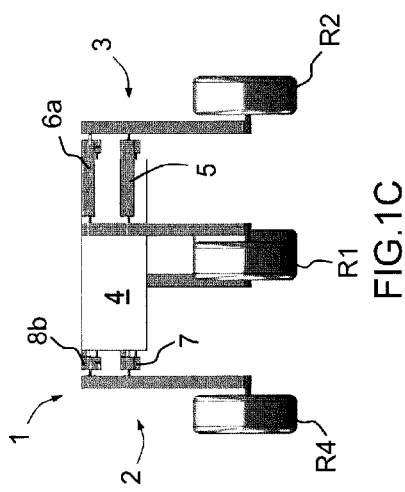
Figure 3A:
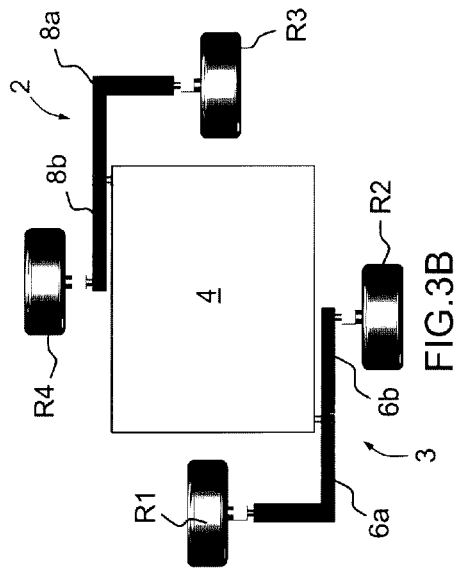
FIGS. 3A to 3D illustrate another specific position of the invention.
Figure 3B:
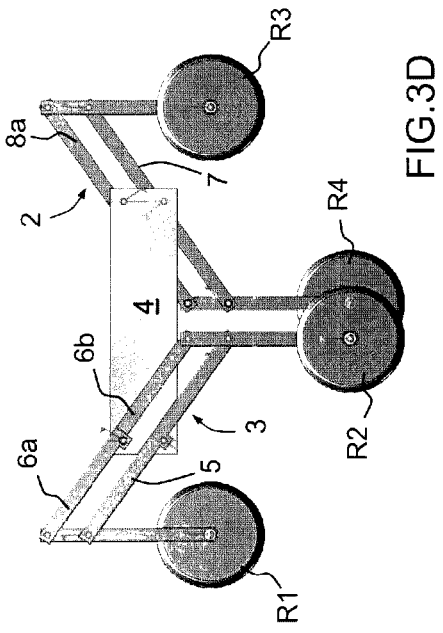
Figure 3C:
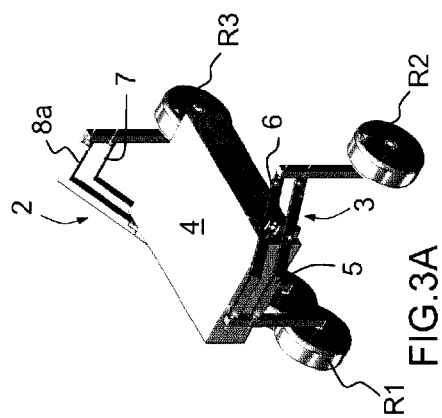
Figure 3D:
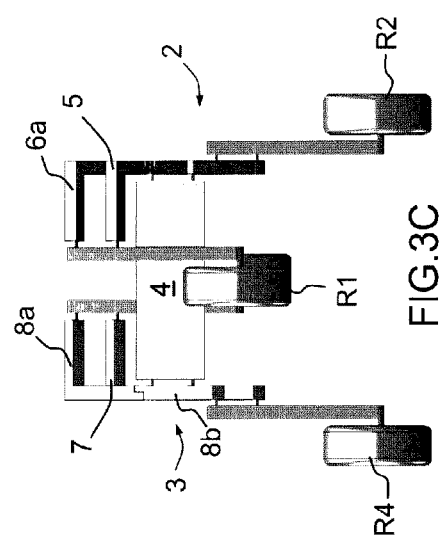

The principle of the invention is illustrated in FIGS. 1A to 1D. FIG. 1A is a perspective top view of the chassis 1.

According to the invention, the chassis 2 comprises two articulated bogies 2, 3 which are connected to a central body 4 by bars 5, 6a and 6b, 7, 8a, 8b, the bars in two portions 6a, 6b, 8a and 8b allowing static indeterminacy to be avoided. Those two bogies 2, 3 are also connected to each other by a system (for example, a mechanical or hydraulic system) which coordinates the relative angle of the bars 5 or 6a or 6b with the central body. In this manner, as can be seen in FIGS. 2A, 2B, 2C, 2D, 3A, 3B, 3C and 3D, the inclination of each of the bogies 2, 3 in relation to the central body 1 forms an angle which has an identical but opposite value.

In a conventional bogie, the wheels can follow a circular trajectory about a pivot which is located between the axes of those wheels. The geometry of the bogies according to the invention is said to be parallel because they allow the wheels thereof to move according to a trajectory which is defined by the geometry of the elements which constitute them but without the pivot location physically existing; thus, it is said to be virtual.

It should be noted that this pivot location is not located on a straight line which passes through the axes of the wheels, but instead therebelow. It should also be noted that, in accordance with the configurations selected, the trajectory of those wheels may be located in different planes.

In this manner, although the vehicle rests on four wheels, the chassis thereof is not statically undetermined and the weight of the central body 4 is distributed in an optimum manner, which ensures a similarly optimum distribution of the traction which is generated by the motorized wheels R1-R4.

FIGS. 2A to 2D illustrate a configuration of the principle of the invention in which the bogies have an inclination of 12°.

FIGS. 3A to 3D illustrate a configuration of the principle of the invention in which the bogies have an inclination of 35°.

Figure 4A:
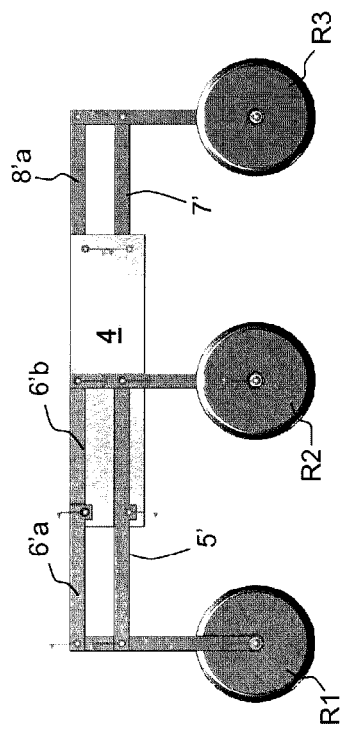
FIGS. 4A and 4B illustrate another configuration of the invention.
Figure 4B:
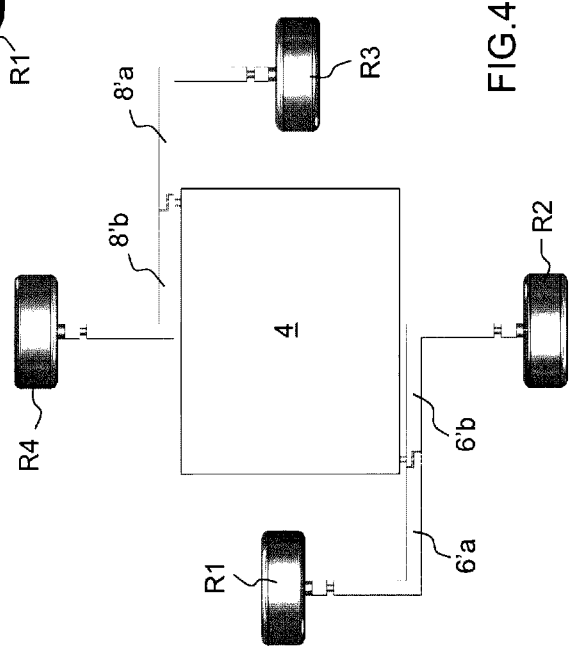

FIGS. 4A and 4B illustrate another configuration in which the wheels R1-R4 are arranged in the manner of a lozenge around the central body 4, the bars 5', 6'a, 6'b, 7', 8'a, 8'b having a different shape from that of the bars 5-8b of the preceding figures. This figure does not illustrate the fact that the wheels R1 and R4 can pivot about themselves and allow a gyration in accordance with FIGS. 10B, C and D.

By providing a wide wheel base and therefore good lateral stability (inclination or centrifugal force), that configuration is particularly well-suited to rapid vehicles which move in a structured environment (for example, vertical steps) and unstructured environment.

FIGS. 5A to 5F illustrate three possible constructions of the same configuration of FIGS. 4A/4B which, although they are mechanically different, are kinematically identical and constitute the same unique configuration.

Figure 6A:
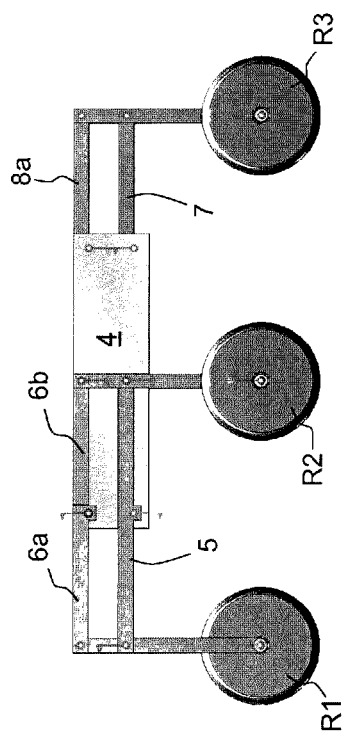
FIGS. 6A and 6B illustrate another configuration of the vehicle according to the invention.
Figure 6B:
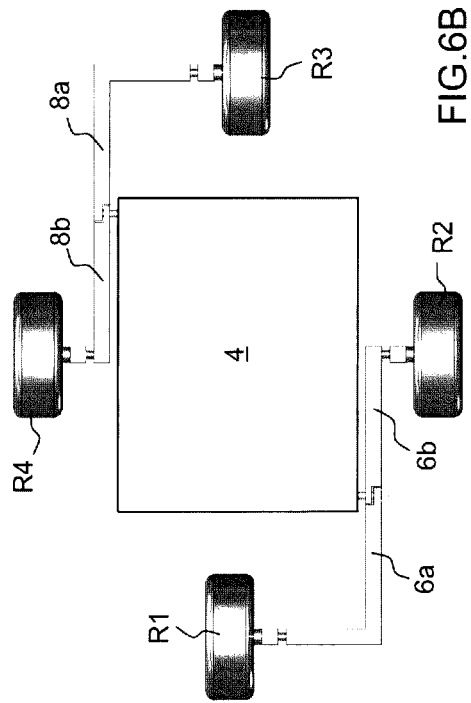

FIGS. 6A-6B illustrate another kinematically identical configuration to the configuration of FIGS. 4A/4B.

This configuration has the wheels R1-R4 in the manner of a lozenge around the central body 4. This Figure does not illustrate the fact that the wheels R1 and R4 can pivot about themselves and allow a gyration in accordance with FIGS. 10B, C and D.

By providing a wheel base which is smaller in relation to the central body than the configuration of FIGS. 4A/4B, this configuration is particularly well-suited to small-sized vehicles which have to enter buildings (doorways) in a structured environment (for example, vertical steps) and unstructured environment.

Figure 7A:
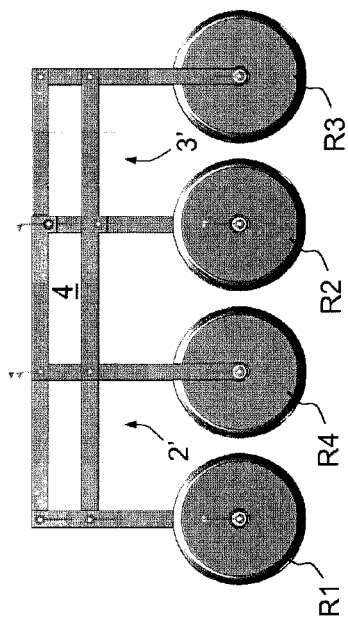
FIGS. 7A and 7B illustrate another configuration of the vehicle according to the invention.
Figure 7B:
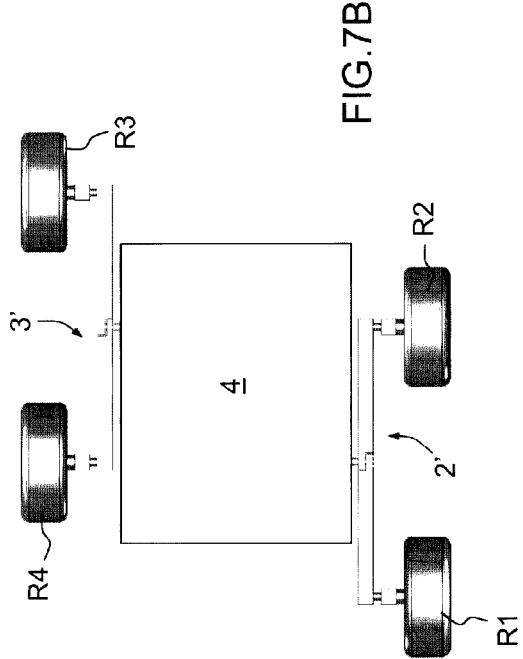

FIGS. 7A and 7B illustrate another configuration of the vehicle according to the invention.

This configuration has the wheels R1-R4 in the manner of a parallelogram around the central body 4. The wheels R1-R4 of each of the bogies 2', 3' are aligned and the trajectory thereof moves in the same plane (2 planes). In a lateral plane, it may be noted that each of the wheels is placed consecutively and equidistantly.

This configuration has two main features:
- front (or rear) access to the central body in relation to the reference direction of movement;
- lateral sequencing of the wheels at four consecutive locations (instead of 3 locations in the preceding configurations).

This configuration is particularly well-suited to a relatively small platform which is autonomous or remotely operated and which is intended for inspection. The sequencing at four locations is particularly well-suited to structured or non-structured environments in which the speed is not a determining criterion. It should be noted that the size of the load may optionally exceed the chassis 4 itself.

If the vehicle is of small size and the mass thereof is reduced, the gyration may be carried out by controlling in a differential manner the speed of the wheels of the left and right bogies 2', 3' (in the manner of a tracked vehicle, "skid steering"). Otherwise, it is appropriate for a minimum of two of the wheels (R1 and R3) to be able to rotate about the vertical axis thereof.

Figure 8A:
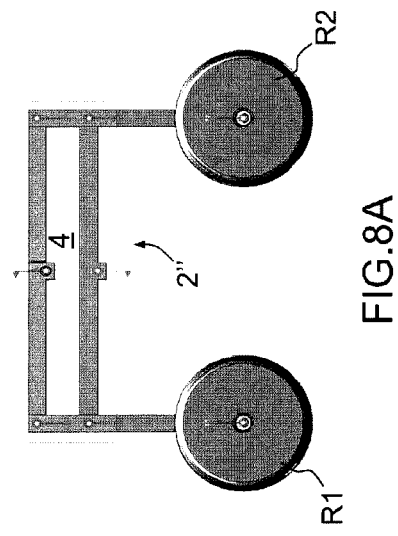
FIGS. 8A and 8B illustrate another configuration of the vehicle according to the invention.
Figure 8B:
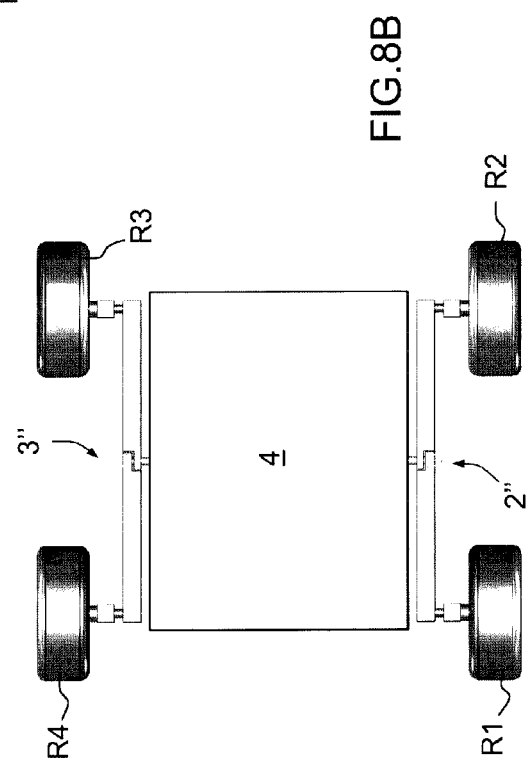

FIGS. 8A and 8B illustrate another configuration of the vehicle according to the invention.

This configuration has the wheels R1-R4 in a square around the central body 4. The wheels of each of the bogies 2", 3" are aligned and the trajectory thereof moves in the same plane (2 planes). In a lateral plane, it may be noted that the two bogies are positioned in a completely symmetrical manner.

This configuration has two main features:
front (or rear) access to the central body in relation to the reference direction of movement;
lateral sequencing of the wheels at two consecutive locations (instead of 3 locations in the preceding configurations of FIGS. 4A/4B).

This configuration is particularly well-suited to a relatively large platform or a platform whose load is great. The sequencing at two locations is particularly well-suited to non-structured environments. It should be noted that the size of the load may optionally exceed the chassis 4 itself.

If the vehicle is of small size and the mass thereof is reduced, the gyration may be carried out by controlling in a differentiated manner the speed of the wheels of the left and right bogies 2", 3" (in the manner of a tracked vehicle). Otherwise, it is appropriate for a minimum of two of the wheels (for example, R1 and R4) to be able to rotate about the vertical axis thereof.

Figure 9A:
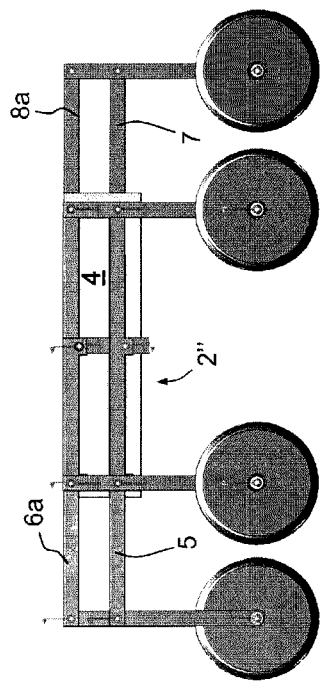
FIGS. 9A and 9B illustrate another configuration of the vehicle according to the invention.
Figure 9B:
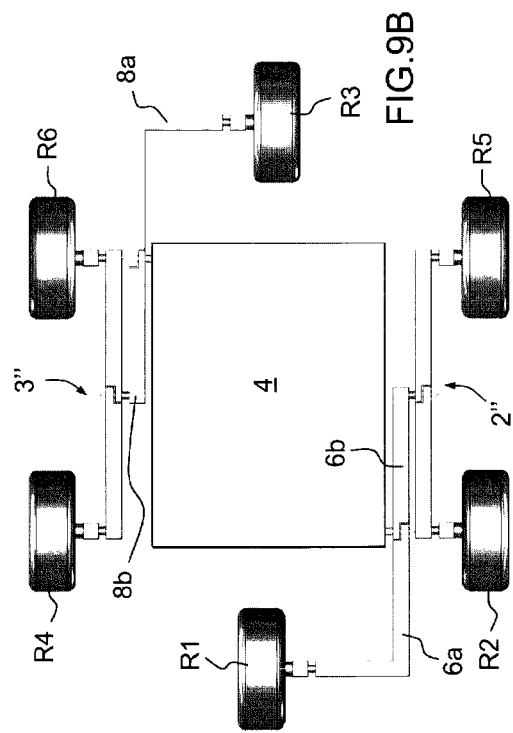

FIGS. 9A and 9B illustrate another configuration of the vehicle according to the invention.

This configuration with six wheels R1-R6 is kinematically identical to the configuration of FIGS. 6A/6B in which the lateral wheel (R2/R4 in FIGS. 6A/6B) of each bogie is replaced by a bogie 2", 3" which is identical to the one used in the configuration of FIGS. 8A/8B with the wheels R2-R5 and R4-R6, respectively.

This configuration has the wheels in the manner of a lozenge around the central body. This figure does not illustrate the fact that the wheels R1 and R3 can pivot about themselves. The gyration is thereby controlled in a manner identical to the configuration of FIGS. 6A/6B taking into consideration that a sliding of the lateral wheels is acceptable during cornering operations.

This configuration is particularly well-suited to large vehicles or vehicles having a very heavy load in relative terms.

It is characterized in that half of the mass of the central body 4 is distributed over the front and lateral wheels. In other words, the front and rear wheels R1, R3 each support ⅓ of the weight of this mass and the four lateral wheels R2, R4, R5, R6 each support ⅙.

Figure 10A:
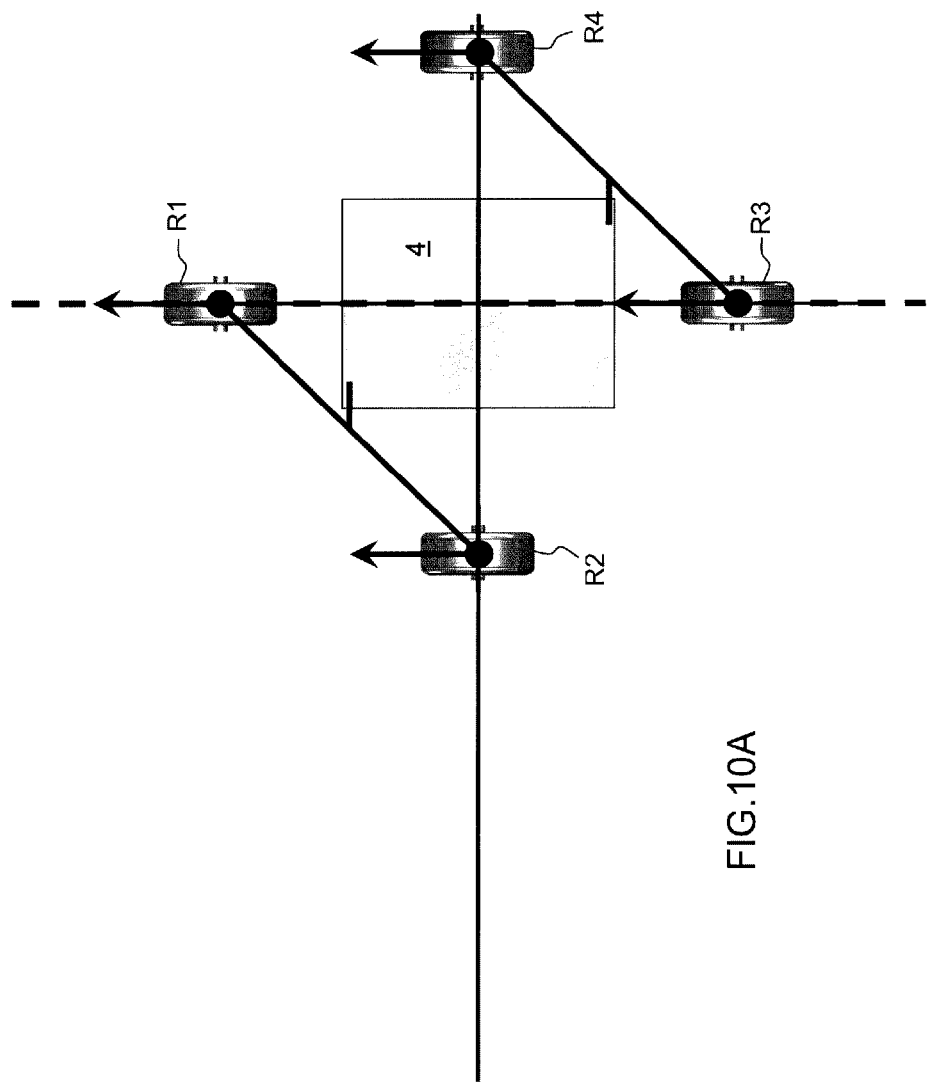
FIGS. 10A to 10D illustrate the gyration possibilities provided by the vehicle according to the invention.
Figure 10B:
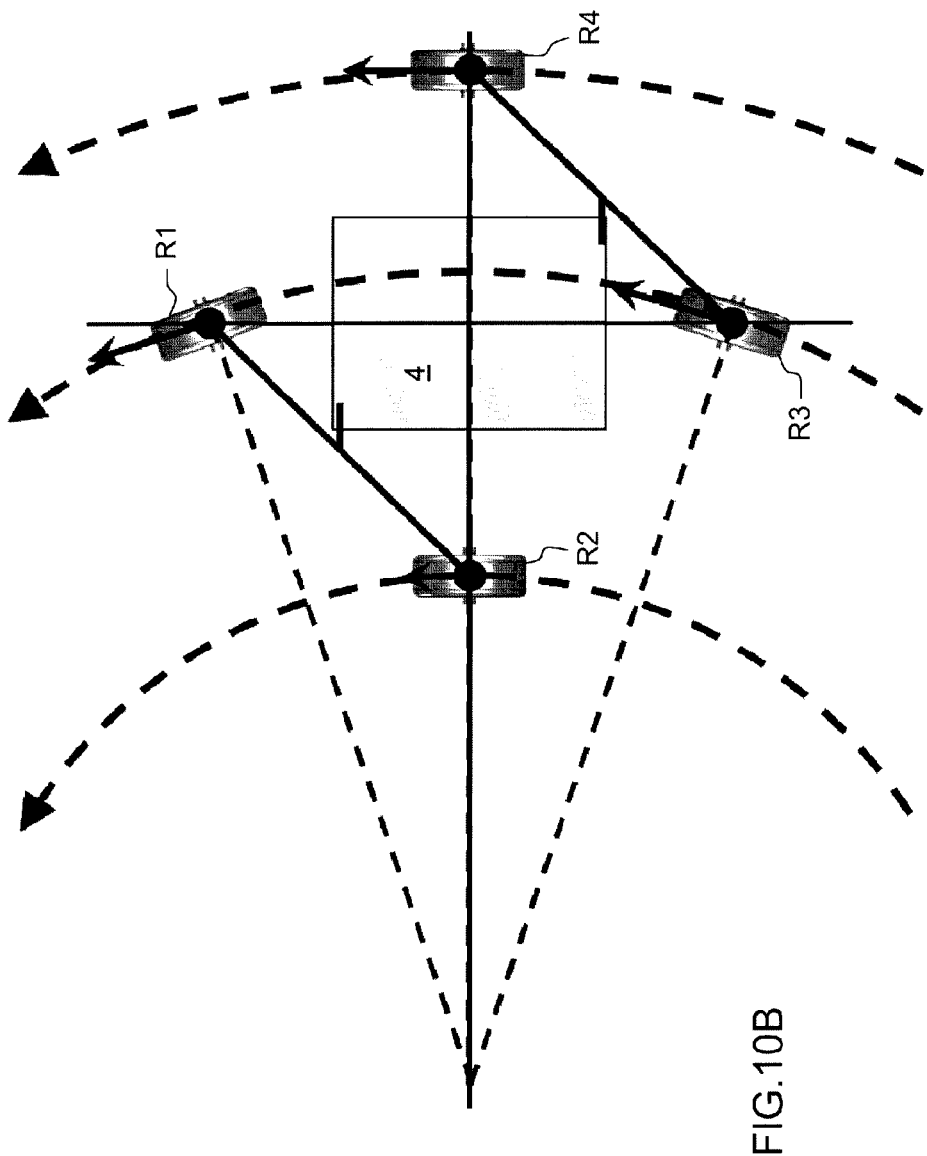

FIGS. 10A to 10D illustrate the gyration possibilities which are provided by the chassis. The relative speed and the angle thereof are illustrated by a vector in the figures.
FIG. 10A: gyration angle=0°;
FIG. 10B: gyration angle=α°>0.

Figure 10C:
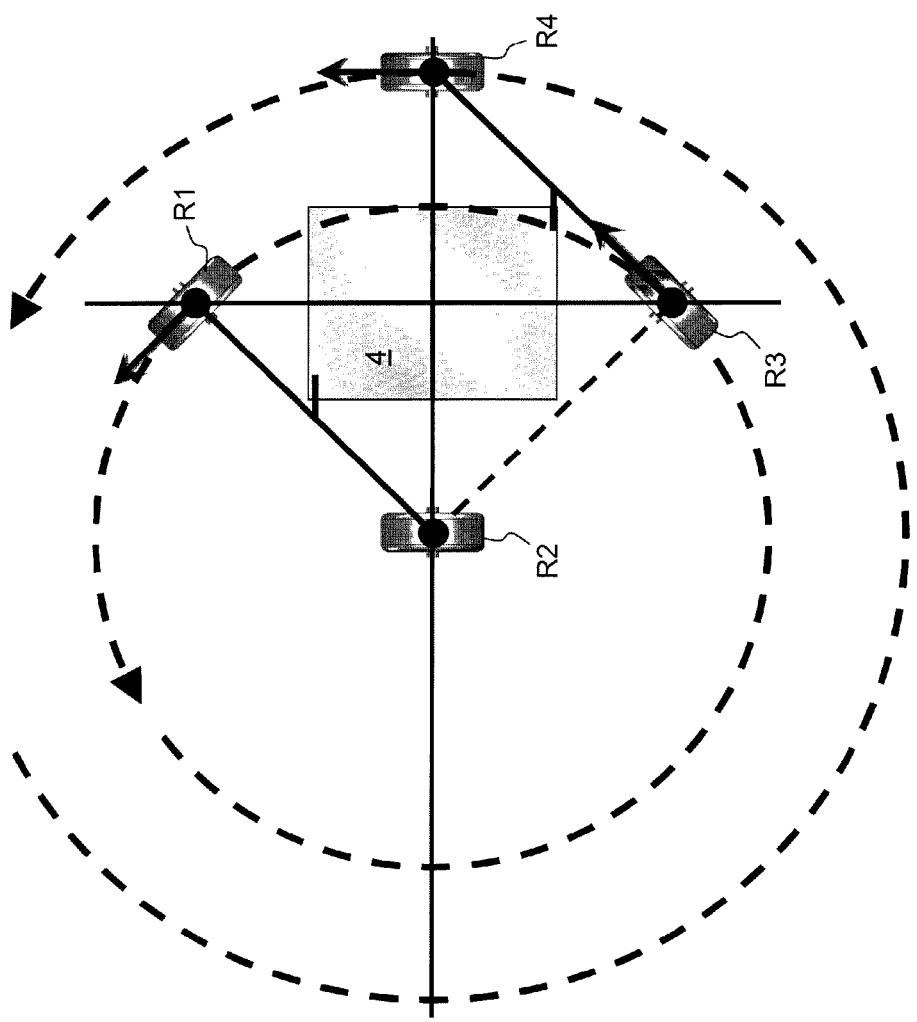

The center of rotation is located at the outer side of the lozenge which is formed by the wheels R1-R4.
FIG. 10C: gyration angle=β°>0.

Figure 10D:
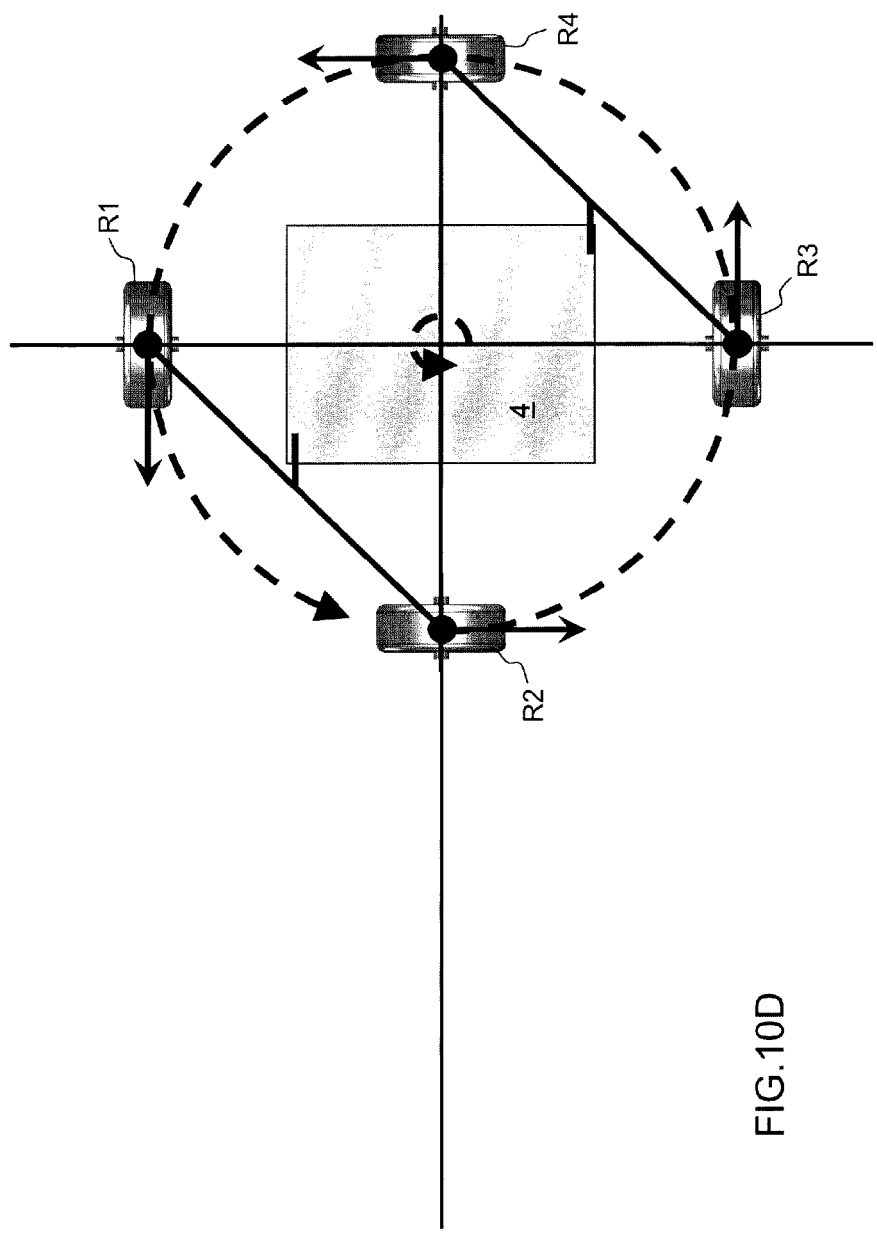

The center of rotation is located on the lozenge which is formed by the wheels R1-R4. The speed of the wheel R2 positioned at the center of rotation is zero.
FIG. 10D: gyration angle=90°.

The center of rotation is located at the center of the lozenge which is formed by the wheels R1-R4 and the vehicle can thus readily rotate about itself.

Figure 11:
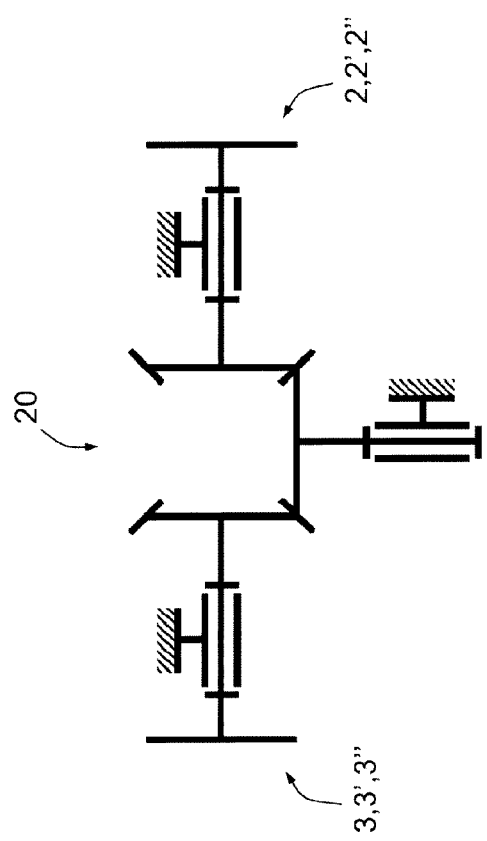
FIG. 11 illustrates the mechanism which connects the two bogies.

FIG. 11 illustrates a possible construction of the mechanism which connects the two bogies. Thus, the two bogies 2, 3, 2', 3', 2", 3", see the preceding figures, are connected to each other by a system (for example, a mechanical or hydraulic system) which coordinates the respective relative angle thereof with the central body 4.

FIG. 11 illustrates a possible mechanical construction by means of gears which are mounted "as a simple differential" which is designated 20. Naturally, other equivalent mechanisms which carry out the same function are possible.

As can be seen in FIGS. 2A-2D or 3A-3D, the rotation movement of a bogie, for example, the bogie 3, will be transmitted to the other bogie 2 but in the opposite direction in accordance with the principle of the present invention.

Figure 12:
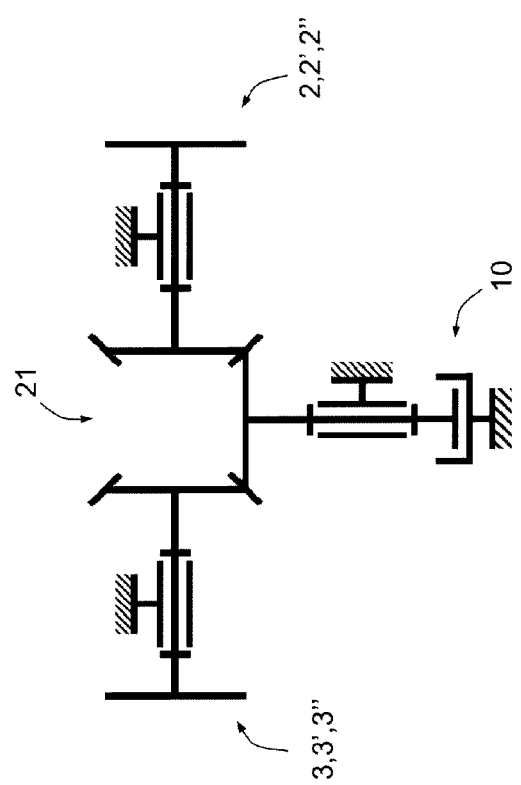
FIG. 12 illustrates a construction variant of the mechanism which connects the bogies.

FIG. 12 illustrates a construction variant of the mechanism 21 which connects the bogies.

The advantage of this construction variant of the mechanism 21 which connects the two bogies 2, 3; 2', 3'; 2", 3" is the possibility of readily adding a shock absorber 10 at the inclination of the bogies. Therefore, no shock absorber is necessary at each of the wheels. The damping means 10 may be a pneumatic shock absorber, hydraulic shock absorber or other equivalent system.

That shock absorber is indicated in particular when the vehicle is caused to move at high speeds.

Figure 13:
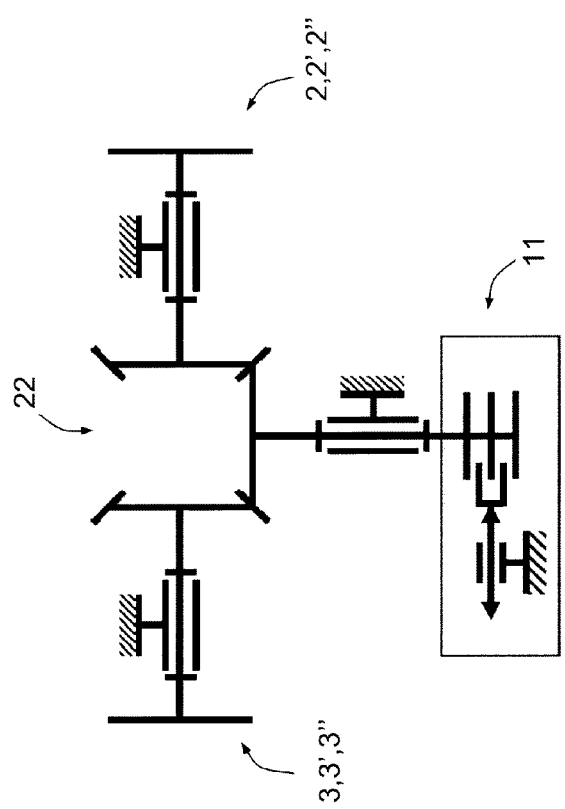
FIG. 13 illustrates another construction variant of the mechanism which connects the bogies.

FIG. 13 illustrates another construction variant of the mechanism 22 which connects the bogies using a variable shock absorber 11. That variable shock absorber 11 is indicated when the vehicle is caused to have high speeds in accordance with specific operating modes and very great clearances in other operating modes. The means used may be a variable viscosity shock absorber 11, for example.

Figure 14:
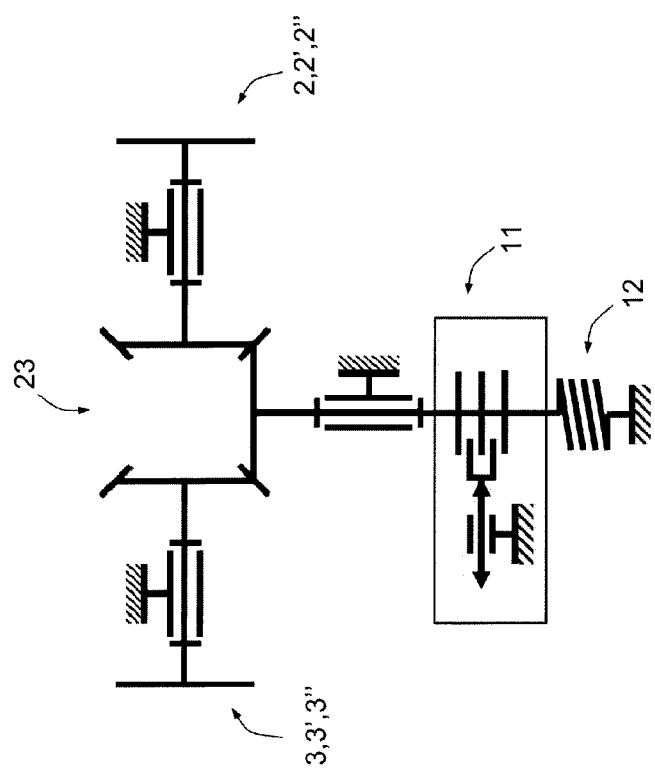
FIG. 14 illustrates another construction variant of the mechanism which connects the bogies.

FIG. 14 illustrates another construction variant of the mechanism 23 which connects the bogies with a preload 12. The preload may be, for example, constructed mechanically by a torsion spring.

Figure 15:
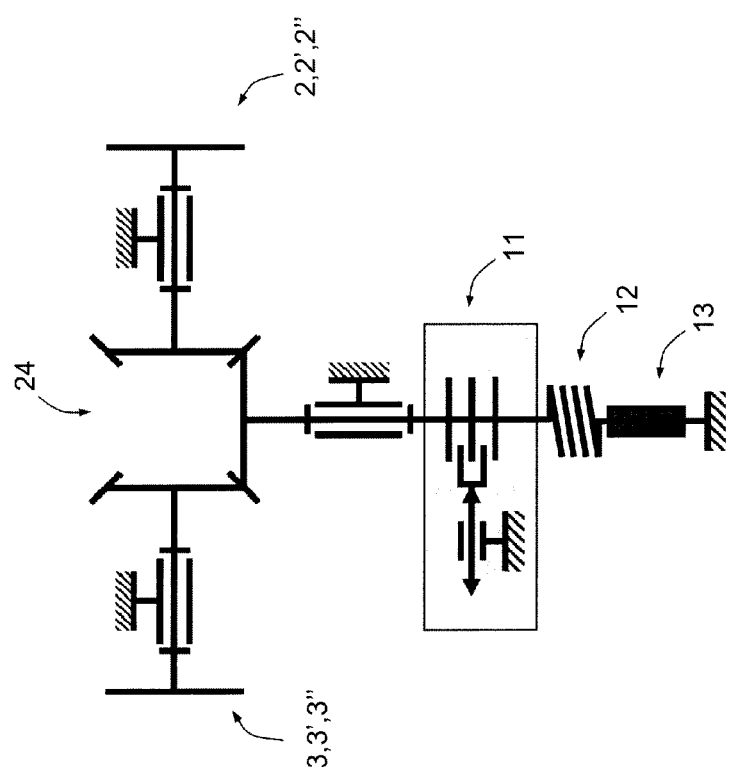
FIG. 15 illustrates another construction variant of the mechanism which connects the bogies.

FIG. 15 illustrates another construction variant of the mechanism 24 which connects the bogies. For requirements involving particularly high clearance, the possibility of varying the preload is quite simple to add by an adjustment means 13, such as, for example, a motor which is mounted in series with a torsion spring 12.

Partial activation of the structure of the chassis is then referred to in accordance with the operating mode.

Figure 16:
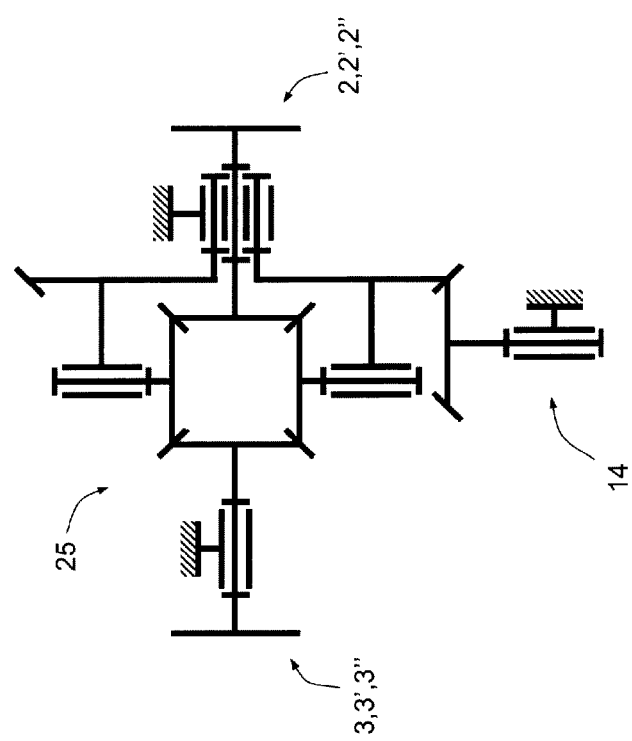
FIG. 16 illustrates another construction variant of the mechanism which connects the bogies.

FIG. 16 illustrates another construction variant of FIG. 11, that is to say, a mechanism 25 which is identical to the one used for transmitting traction to the drive wheels in a car. An additional gear 14 allows the assembly of the differential to be inclined by adding a displacement γ which is identical to the relative inclination a of each of the bogies. The inclination of the bogie 3 thereby becomes γ+α; the inclination of the bogie 2 thereby becomes γ−α.

This synchronization configuration is particularly appropriate for the configuration of FIGS. 8A and 8B.

This is because the additional degree of freedom (gear 14) allows, where necessary, active stabilization of the central body 4 of the vehicle with respect to the horizontal (or parallel with the ground) whatever the relative inclination of the bogies.

Figure 17:
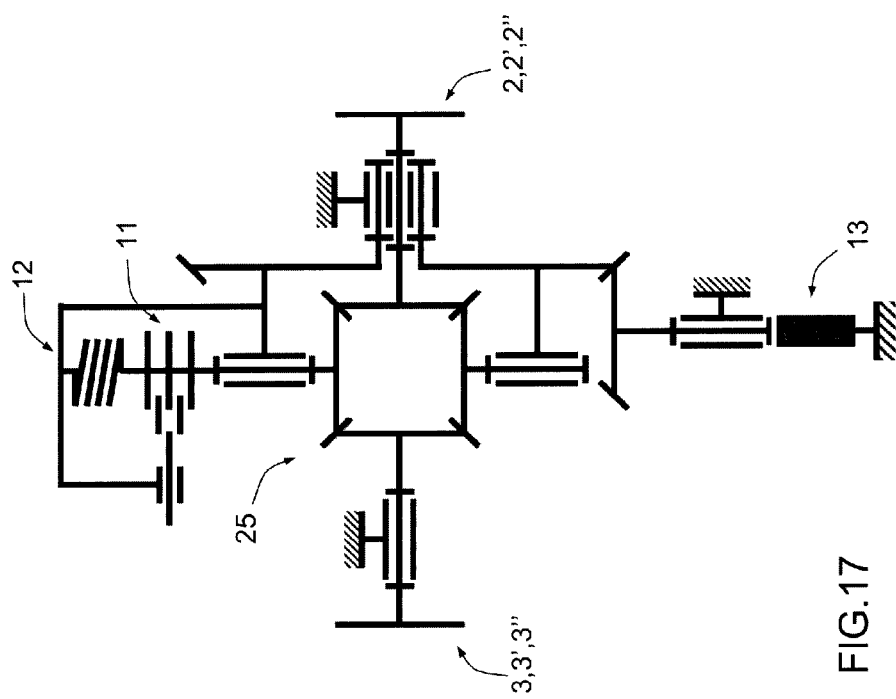
FIG. 17 illustrates another construction variant of the mechanism which connects the bogies.

FIG. 17 illustrates that the mechanism of FIG. 16 remains compatible with the addition of a shock absorber and a preload 12 as set out in FIG. 14 with a variable (or non-variable) shock absorber 11, a preload 12 and a possible means of adjustment 13 of the gear 14.

Figure 18:
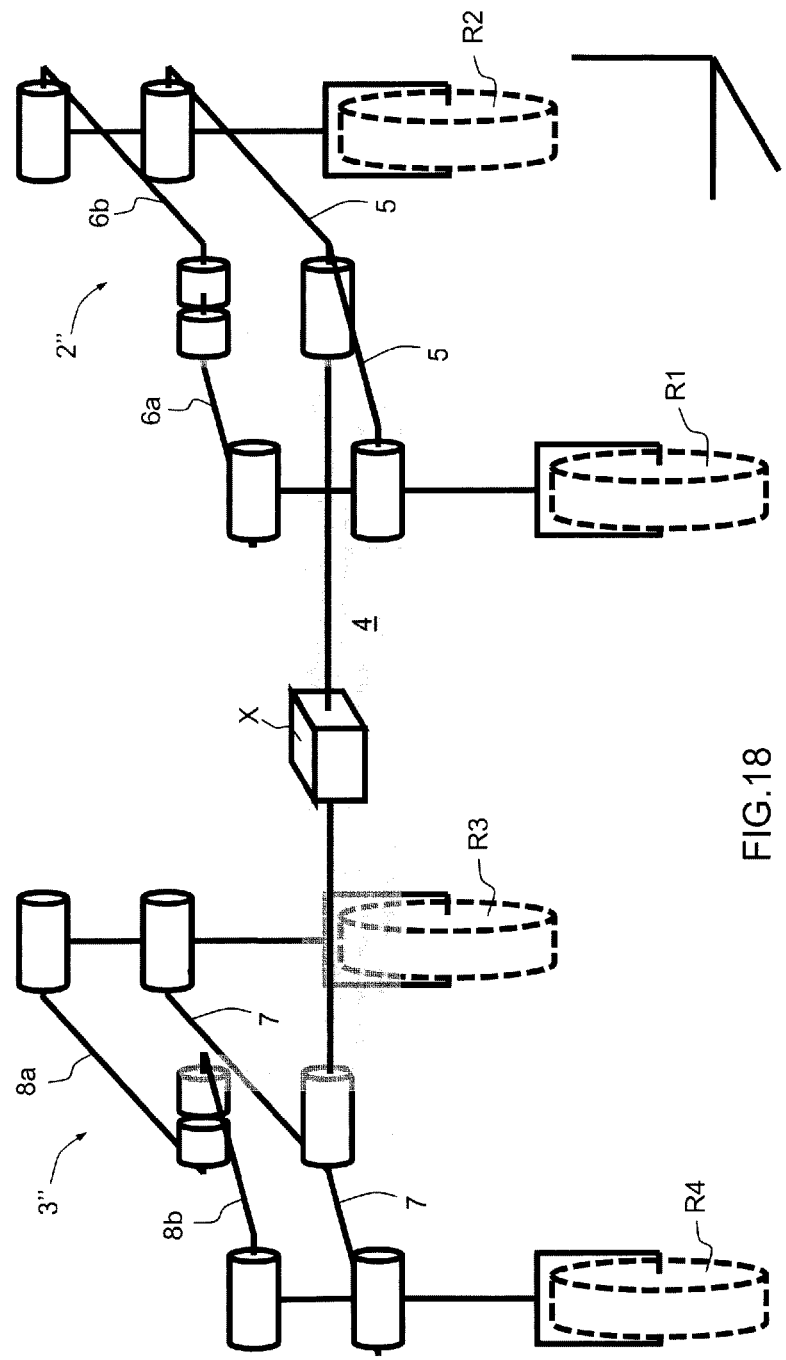
FIG. 18 illustrates another construction variant of the mechanism which connects the bogies.

FIG. 18 is another graphic representation of a configuration which is identical to the one in FIGS. 8A and 8B. It allows it to be seen that the mechanism which connects the two bogies and which is represented by the box X at the center of the vehicle may be, for example, directly connected to the lower bars 5 and 7 of the bogies, 6a/6b and 8a/8b being the upper bars of the bogies.

Figure 19:
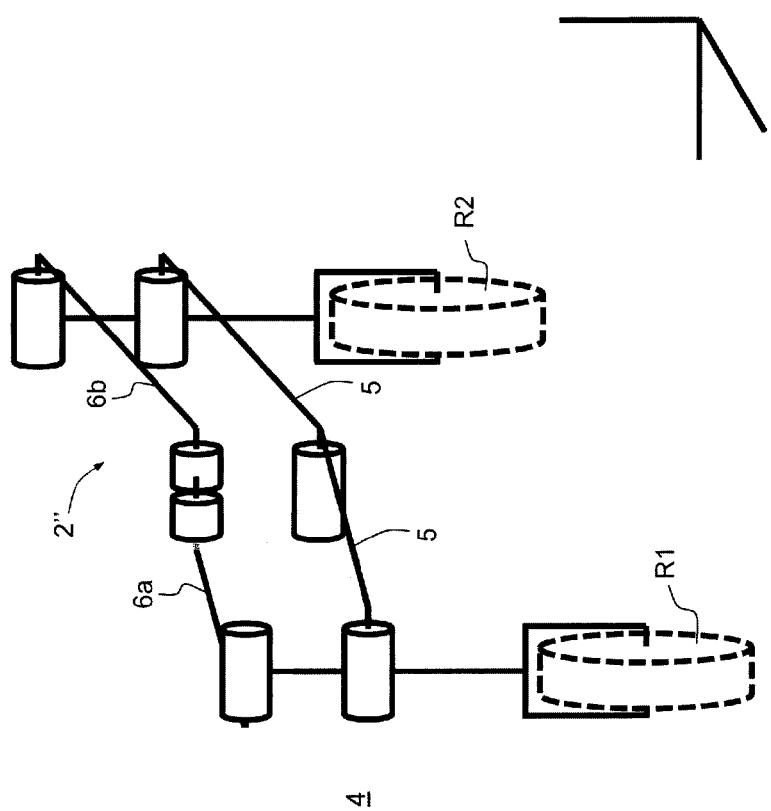
FIG. 19 illustrates another construction variant of the mechanism which connects the bogies.

FIG. 19 is a detail of a single one of the bogies of FIG. 18. It allows an appreciation that the bar 5 is not a straight line; it is this angle in the region of the articulation of this bar to the central body 4 which allows the virtual pivot location of the trajectory of the wheels to be located below the plane which extends through the two axes of the wheels.

Figure 20:
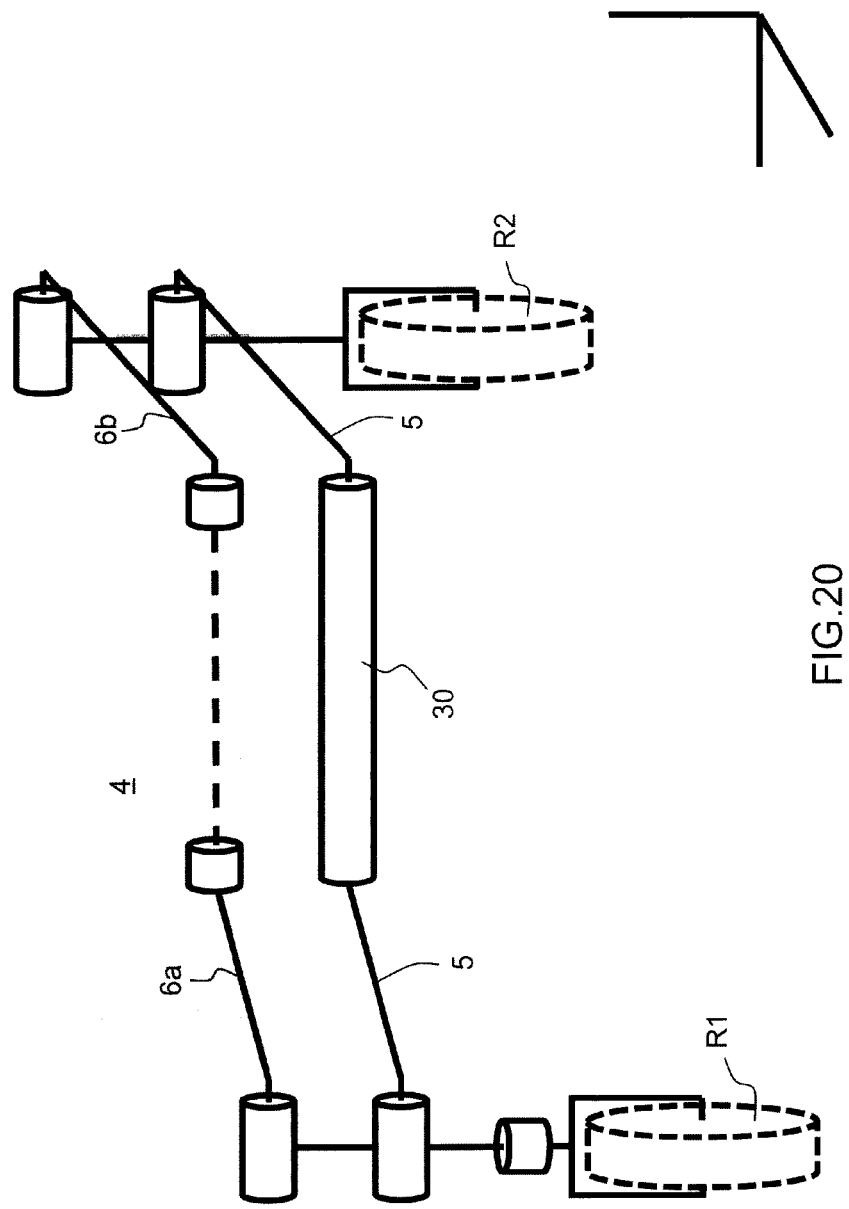
FIG. 20 illustrates another construction variant of the mechanism which connects the bogies.

FIG. 20 is another graphic representation of a single bogie of a configuration which is identical to the one in FIG. 5E. The bar 5 is modified in relation to FIG. 19 in such a manner as to pass by means of the rotation axis 30 thereof over half of the width of the vehicle. There can also be seen above the wheel R1 the rotation mechanism Z of the wheel about the vertical axis.

FIGS. 21A to 21H illustrate a clearance sequence in one of the configurations proposed in accordance with FIGS. 6A/6B and 1A to 3D.

Figure 21C:
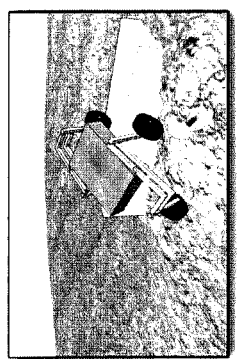
FIGS. 21A to 21H illustrate a clearance sequence.
Figure 21F:
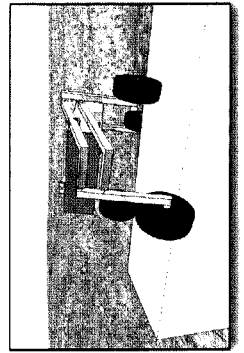
Figure 21B:
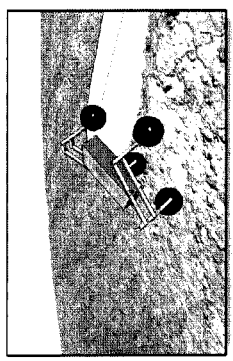
Figure 21E:
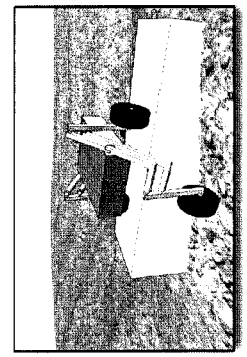
Figure 21H:
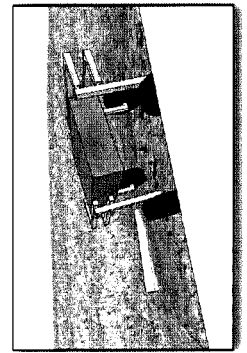
Figure 21A:
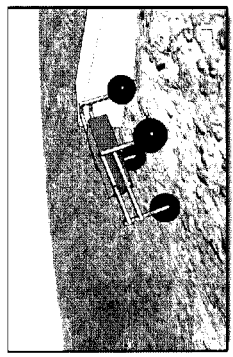

In FIG. 21a, the vehicle arrives in front of an obstacle. In FIG. 21B, the front wheel of the vehicle climbs on the obstacle which inclines the bogie as a result of the climbing movement of the wheel.

At the same time, the other bogie is inclined in the other direction by the same angular value as a result of the connection between the bogies.

In FIG. 21C, the front wheel is on the obstacle and the inclination of the front bogie is taken up by the rear bogie in the other direction.

Figure 21D:
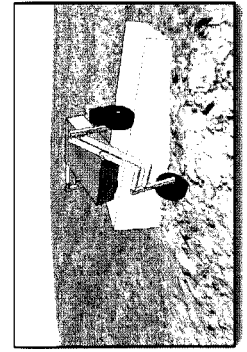

In FIG. 21D, the front wheel and the two wheels at the center are on the obstacle.

In FIG. 21E, the rear wheel begins to climb on the obstacle.

In FIG. 21F, the rear wheel arrives on the obstacle.

Figure 21G:
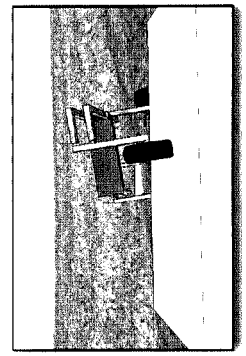

In FIG. 21G, the vehicle descends at the other side of the obstacle and in FIG. 21H the vehicle has completely overcome the obstacle.

The vehicle according to the invention may be driven, remote controlled or autonomous. The means necessary for the control thereof (driven or remote control or autonomous, or in combination) are known to the person skilled in the art and may be transferred from existing fields, typically driving cars or radio-controlled instructions for vehicles (toys, robots, etc.).

The embodiments and operating modes described above are non-limiting examples which illustrate the invention. Variants are possible without departing from the scope of protection claimed, in particular using equivalent means. The different constructions and variants may also be combined.

The invention claimed is:

1. A vehicle having a great clearance capacity, comprising:
   four wheels; and
   a base,
   wherein the wheels are fixed in pairs to the base by bars and form a bogie per pair of wheels,
   wherein the bogies are being articulated in terms of rotation to the base so that a pivot location of a trajectory of the wheels when articulated is located under a first rotation axis of the wheels of the bogie when the bogie is horizontal, and
   wherein the rotation of one bogie is transmitted by a transmission device to the other bogie in such a manner that an inclination angle of one of the bogies with respect to the base is imparted to the other of the bogies with an identical value but opposite direction.

2. The vehicle as claimed in claim 1, wherein the transmission device includes a differential.

3. The vehicle as claimed in claim 1, wherein the transmission device includes a shock absorber.

4. The vehicle as claimed in claim 1, wherein the transmission device includes a preload device.

5. The vehicle as claimed in claim 4, wherein the preload device includes an adjustable spring.

6. The vehicle as claimed in claim 1, wherein each wheel is driven individually.

7. The vehicle as claimed in claim 1, wherein at least one of the wheels is configured to rotate about a second rotation axis which is perpendicular to the first rotation axis thereof.

8. The vehicle as claimed in claim 1, wherein rotational axes of the wheels of a bogie are configured to be aligned in a same plane that is parallel to a horizontal extension of the base.

9. The vehicle as claimed in claim 1, wherein rotational axes of the wheels of a bogie are configured to be aligned in two different and parallel planes that are parallel to a horizontal extension of the base.

10. The vehicle as claimed in claim 9, wherein a wheel of a bogie is in a same plane as a wheel of the other bogie.

11. The vehicle as claimed in claim 8, wherein the two bogies are aligned relative to each other or are offset relative to each other.

12. The vehicle as claimed in claim 1, wherein at least one of the wheels of the bogie is replaced by a pair of wheels.

13. The vehicle as claimed in claim 1 further comprising a controller for remote controlling the vehicle.

* * * * *